US006861472B2

(12) United States Patent
Adedeji et al.

(10) Patent No.: US 6,861,472 B2
(45) Date of Patent: Mar. 1, 2005

(54) POLY(ARYLENE ETHER)-POLYOLEFIN COMPOSITIONS AND ARTICLES DERIVED THEREFROM

(75) Inventors: Adeyinka Adedeji, Albany, NY (US); Thomas J. Hartle, Delmar, NY (US); John C. Haylock, Schenectady, NY (US)

(73) Assignee: General Electric Company, Pittfield, MA (US)

( * ) Notice: Subject to any disclaimer, the term of this patent is extended or adjusted under 35 U.S.C. 154(b) by 0 days.

(21) Appl. No.: 09/682,923

(22) Filed: Nov. 1, 2001

(65) Prior Publication Data

US 2002/0137840 A1 Sep. 26, 2002

Related U.S. Application Data

(60) Provisional application No. 60/258,839, filed on Dec. 28, 2000.

(51) Int. Cl.[7] .................................................. C08L 53/00
(52) U.S. Cl. ............................. 525/68; 525/69; 525/89; 525/99
(58) Field of Search ......................... 525/68, 69, 89, 525/99, 79

(56) References Cited

U.S. PATENT DOCUMENTS

| | | |
|---|---|---|
| 4,239,673 A | 12/1980 | Lee, Jr. |
| 4,242,263 A | 12/1980 | Lee, Jr. |
| 4,299,757 A | 11/1981 | Kuribayashi et al. |
| 4,383,082 A | 5/1983 | Lee, Jr. |
| 4,460,743 A | 7/1984 | Abe et al. |
| 4,480,057 A | 10/1984 | Sano |
| 4,713,416 A | 12/1987 | Del Guidice et al. |
| 4,764,559 A | 8/1988 | Yamauchi et al. |
| 4,772,657 A | 9/1988 | Akiyama et al. |
| 4,863,997 A | 9/1989 | Shibuya et al. |
| 4,892,904 A | 1/1990 | Ting |
| 4,962,148 A | 10/1990 | Orikasa et al. |
| 4,985,495 A | 1/1991 | Nishio et al. |
| 4,990,558 A | 2/1991 | DeNicola, Jr. et al. |
| 4,994,508 A | 2/1991 | Shiraki et al. |
| 5,061,753 A | 10/1991 | Maruyama et al. |
| 5,071,911 A | 12/1991 | Furuta et al. |

(List continued on next page.)

FOREIGN PATENT DOCUMENTS

| | | |
|---|---|---|
| EP | 0 326 895 A2 | 1/1989 |
| EP | 412.787 A2 | 2/1991 |
| EP | 0 765 914 A1 | 5/1995 |
| EP | 1 029 876 | 9/1999 |
| GB | 1 559 262 | 12/1977 |
| JP | 63-113047 | 5/1988 |
| JP | 63-113049 | 5/1988 |
| JP | 63-113050 | 5/1988 |
| JP | 01-098647 | 4/1989 |
| JP | 03-259941 | 11/1991 |
| JP | 04-007357 | 1/1992 |
| JP | 04-028739 | 1/1992 |
| JP | 04-028740 | 1/1992 |
| JP | 04-279697 | 10/1992 |
| JP | 04-293942 | 10/1992 |
| JP | 05-070679 | 3/1993 |
| JP | 05-295184 | 11/1993 |
| JP | 06-009828 | 1/1994 |
| JP | 06-016924 | 1/1994 |
| JP | 06-057130 | 3/1994 |
| JP | 06-136202 | 5/1994 |
| JP | 07-003083 | 1/1995 |
| JP | 07-304908 | 11/1995 |
| JP | 09-316322 | 12/1997 |
| JP | 11-060836 | 3/1999 |
| JP | 2000-143891 | 5/2000 |
| JP | 2003277555 A | 10/2003 |
| WO | WO 90/05759 | 5/1990 |
| WO | WO 91/05016 | 4/1991 |

OTHER PUBLICATIONS

Chemical Abstract for JP 2003277555.
Derwent Abstract for JP 58–93730.
TUFTEC® P–Series High Performance Thermoplastic Elastomer, pp. 1–2, <http: www.asahi–kasei.co.jp/plastic/e/technical/br/p–series.htm>.
M. K. Akkapeddi and B. VanBuskirk, Adv. Polym. Technol. (1992), vol. 11, No. 4, pp. 263–275.
G.–X. Wei, H.–J. Sue, J. Chu, C. Huang, K. Gong, "Morphology and Mechanical Property of Poly(phenylene oxide) Modified Polypropylene Blends", ANTEC '99, vol. III, New York City, May 2nd–6th, 1999, pp. 3443–3447.
Chemical Abstracts Record for JP 03181555.
Chemical Abstracts Record for JP 03185058.
Chemical Abstracts Record for JP 03231962.
Chemical Abstracts Record for JP 04183748.
Chemical Abstracts Record for JP 07165998.
Chemical Abstracts Record for JP 07166026.
U.S. Appl. No. 09/682,919, filed Nov. 1, 2001, Adedeji et al.
U.S. Appl. No. 09/682,920, filed Nov. 1, 2001, Adedeji et al.
U.S. Appl. No. 09/682,921, filed Nov. 1, 2001, Adedeji et al.
U.S. Appl. No. 09/682,926, filed Nov. 1, 2001, Adedeji et al.
U.S. Appl. No. 09/682,928, filed Nov. 1, 2001, Adedeji et al.
U.S. Appl. No. 09/682,929, filed Nov. 1, 2001, Adedeji et al.
U.S. Appl. No. 09/683,766, filed Feb. 12, 2002, Adedeji et al.
U.S. Appl. No. 10/063,336, filed Apr. 12, 2002, Adedeji et al.
TUFTEC® H1043 Technical Bulletin, Dec. 16, 1999, Asahi Chemical Industry Co., ltd., pp. 1–5.

*Primary Examiner*—Jeffrey Mullis

(57) ABSTRACT

A thermoplastic composition includes specified amounts of a poly(arylene ether), a homopolymer of an alkenyl aromatic monomer, a polyolefin, a hydrogenated block copolymer, and an unhydrogenated block copolymer, but the composition is substantially free of any rubber-modified poly (alkenyl aromatic) resin. The composition provides high stiffness and high impact strength and is suitable for molding a variety of articles, including automotive underhood components.

35 Claims, No Drawings

U.S. PATENT DOCUMENTS

| | | |
|---|---|---|
| 5,071,912 A | 12/1991 | Furuta et al. |
| 5,075,376 A | 12/1991 | Furuta et al. |
| 5,079,295 A | 1/1992 | Furuta et al. |
| 5,081,187 A | 1/1992 | Maruyama et al. |
| 5,086,112 A | 2/1992 | Togo et al. |
| 5,106,696 A | 4/1992 | Chundury et al. |
| 5,124,410 A | 6/1992 | Campbell |
| 5,132,363 A | 7/1992 | Furuta et al. |
| 5,149,740 A | 9/1992 | Maruyama et al. |
| 5,159,004 A | 10/1992 | Furuta et al. |
| 5,162,433 A | 11/1992 | Nishio et al. |
| 5,162,435 A | 11/1992 | Shibuya et al. |
| 5,162,440 A | 11/1992 | Akkapeddi et al. |
| 5,166,264 A | 11/1992 | Lee, Jr. et al. |
| 5,182,151 A | 1/1993 | Furuta et al. |
| 5,191,024 A | 3/1993 | Shibata et al. |
| 5,206,281 A | 4/1993 | Furuta |
| 5,262,477 A | 11/1993 | Kasai et al. |
| 5,268,425 A | 12/1993 | Furuta et al. |
| 5,272,208 A | 12/1993 | Shiraki et al. |
| 5,272,209 A | 12/1993 | Shiraki et al. |
| 5,278,220 A | 1/1994 | Vermeire et al. |
| 5,286,791 A | 2/1994 | DeNicola, Jr. et al. |
| 5,290,856 A | 3/1994 | Okamoto et al. |
| 5,296,540 A | 3/1994 | Akiyama et al. |
| 5,304,593 A | 4/1994 | Nishio et al. |
| 5,321,081 A | 6/1994 | Chundury et al. |
| 5,369,173 A | 11/1994 | Furuta |
| 5,370,813 A | 12/1994 | DeNicola, Jr. et al. |
| 5,397,822 A | 3/1995 | Lee, Jr. et al. |
| 5,405,902 A | 4/1995 | Nishio et al. |
| 5,418,287 A | 5/1995 | Tanaka et al. |
| 5,424,360 A | 6/1995 | Nagaoka et al. |
| 5,428,091 A | 6/1995 | Abe et al. |
| 5,461,111 A | 10/1995 | Modic et al. |
| 5,473,015 A | 12/1995 | DeNicola, Jr. et al. |
| 5,494,962 A | 2/1996 | Gauthy et al. |
| 5,648,424 A | 7/1997 | Miwa et al. |
| 5,686,528 A | 11/1997 | Wills et al. |
| 5,705,556 A | 1/1998 | Djiauw et al. |
| 5,777,028 A | 7/1998 | Okada et al. |
| 5,902,850 A | 5/1999 | Chino et al. |
| 6,005,050 A | 12/1999 | Okada et al. |
| 6,013,726 A | 1/2000 | Nakano et al. |
| 6,031,049 A | 2/2000 | Chino et al. |
| 6,045,883 A | 4/2000 | Akiyama et al. |
| 6,057,401 A | 5/2000 | Modic |
| 6,258,881 B1 | 7/2001 | Moritomi |
| 6,300,417 B1 | 10/2001 | Sue et al. |
| 2002/0023845 A1 | 2/2002 | Ding et al. |
| 2003/0181587 A1 | 9/2003 | Sasagawa et al. |

POLY(ARYLENE ETHER)-POLYOLEFIN COMPOSITIONS AND ARTICLES DERIVED THEREFROM

CROSS REFERENCE TO RELATED APPLICATIONS

This application claims the benefit of U.S. Provisional Application Ser. No. 60/258,839 filed Dec. 28, 2000.

BACKGROUND OF INVENTION

Compositions comprising poly(arylene ether)s and polyolefins are known in the art, and compositions further comprising specific impact modifiers and compatibilizing agents have been described.

U.S. Pat. No. 4,713,416 to Del Giudice et al. generally describes compositions comprising (a) a polyphenylene ether, (b) a thermoplastic polymer incompatible with the PPE, and (c) a polymeric compatibility-promoting agent comprising one or more blocks of vinylaromatic monomer units compatible with the polyphenylene ether (a) and one or more blocks of monomeric units of the same nature as the thermoplastic polymer (b) or compatible with that polymer.

U.S. Pat. No. 4,764,559 to Yamauchi et al. generally describes a composition comprising (a) a polyphenylene ether having a low degree of polymerization, with or without a styrene resin, (b) a polyolefin, and (c) a styrene compound/conjugated diene block copolymer or a hydrogenation product thereof.

U.S. Pat. No. 4,863,997 to Shibuya et al. generally describes a composition comprising (a) a polyolefin resin, (b) a polyphenylene ether resin, and (c) a hydrogenated block copolymer of an alkenyl aromatic compound and a conjugated diene that contains 45–80 weight percent of a repeating unit derived from the alkenyl aromatic compound.

U.S. Pat. No. 5,071,912 to Furuta et al. generally describes a composition comprising (a) a polyphenylene ether, (b) a styrene-modified propylene polymer or a composition containing a styrene-modified propylene polymer and polypropylene, and (c) at least two rubbery substances, one being compatible with (a) and the other incompatible with (a).

U.S. Pat. No. 5,081,187 to Maruyama et al. generally describes a composition comprising specific amounts of (a) a polyolefin, (b) a polyphenylene ether, (c) a partially hydrogenated alkenyl aromatic compound-isoprene block copolymer, and (d) an alkenyl aromatic compound-conjugated diene block copolymer.

U.S. Pat. No. 5,418,287 to Tanaka et al. generally describes a composition comprising (a) a polyphenylene ether, (b) a crystalline polyolefin resin, and (c) a graft copolymer where the backbone is a copolymer of (i) ethylene or at least one $C_3$–$C_{12}$ alpha-olefin, and (ii) at least one chain nonconjugated diene.

U.S. Pat. No. 6,031,049 to Chino et al. generally describes a composition comprising specific amounts of (a) a component composed of syndiotactic polystyrene and a polyolefin, (b) a block or graft styrene-olefin copolymer having a styrene content of 40 to 85% by weight, and (c) a polyphenylene ether.

European Patent Application No. 412,787 A2 to Furuta et al. generally describes compositions comprising (a) a polyphenylene ether, (b) a propylene polymer modified by grafting with a styrene-based monomer alone or in combination with another copolymerizable monomer, with or without an unmodified propylene polymer, and (c) a rubbery substance having chain A miscible with all or part of (a) and chain B miscible with all or part of (b).

The commercial value of the above described compositions has been limited by deficiencies in the balance between stiffness and impact strength, as well as the consistency of various properties from batch to batch and from molded sample to molded sample within the same batch. There remains a need for poly(arylene ether)-polyolefin compositions having improved property balances. In particular, there remains a need for poly(arylene ether)-polyolefin compositions exhibiting high stiffness while maintaining excellent impact strength. There also remains a need for poly(arylene ether)-polyolefin compositions exhibiting reduced batch-to-batch and sample-to-sample variability in key properties, including stiffness and impact strength.

SUMMARY OF INVENTION

The above-described and other drawbacks and disadvantages of the prior art are alleviated by a thermoplastic composition, comprising: about 15 to about 35 weight percent of a poly(arylene ether); about 15 to about 46 weight percent of a homopolymer of an alkenyl aromatic monomer; about 10 to about 35 weight percent of a polyolefin; and about 1 to about 15 weight percent of a hydrogenated block copolymer of alkenyl aromatic compound and a conjugated diene having an alkenyl aromatic content of about 40 to about 90 weight percent; wherein the composition is substantially free of rubber-modified poly (alkenyl aromatic) resin; and wherein all weight percents are based on the total weight of the composition.

Other embodiments, including the reaction products of the above composition as well as articles comprising the composition and its reaction products, are described below.

DETAILED DESCRIPTION

One embodiment is a thermoplastic composition, comprising: about 15 to about 35 weight percent of a poly (arylene ether); about 15 to about 46 weight percent of a homopolymer of an alkenyl aromatic monomer; about 10 to about 35 weight percent of a polyolefin; about 1 to about 15 weight percent of a hydrogenated block copolymer of alkenyl aromatic compound and a conjugated diene having an alkenyl aromatic content of about 40 to about 90 weight percent; and about 1 to about 15 weight percent of an unhydrogenated block copolymer of alkenyl aromatic compound and a conjugated diene; wherein the composition is substantially free of rubber-modified poly(alkenyl aromatic) resin; and wherein all weight percents are based on the total weight of the composition.

The composition may comprise any poly(arylene ether). The term poly(arylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Poly(arylene ether)s are known polymers comprising a plurality of structural units of the formula

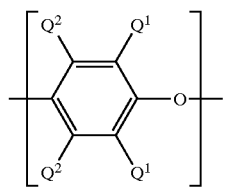

wherein for each structural unit, each $Q^1$ is independently halogen, primary or secondary $C_1$–$C_8$ alkyl, phenyl, $C_1$–$C_8$ haloalkyl, $C_1$–$C_8$ aminoalkyl, $C_1$–$C_8$ hydrocarbonoxy, or $C_2$–$C_8$ halohydrocarbonoxy wherein at least two carbon atoms separate the halogen and oxygen atoms; and each $Q^2$ is independently hydrogen, halogen, primary or secondary $C_1$–$C_8$ alkyl, phenyl, $C_1$–$C_8$ haloalkyl, $C_1$–$C_8$ aminoalkyl, $C_1$–$C_8$ hydrocarbonoxy, or $C_2$–$C_8$ halohydrocarbonoxy wherein at least two carbon atoms separate the halogen and oxygen atoms. Preferably, each $Q^1$ is alkyl or phenyl, especially $C_{1-4}$ alkyl, and each $Q^2$ is independently hydrogen or methyl.

Both homopolymer and copolymer poly(arylene ether)s are included. The preferred homopolymers are those comprising 2,6-dimethylphenylene ether units. Suitable copolymers include random copolymers comprising, for example, such units in combination with 2,3,6-trimethyl-1,4-phenylene ether units or copolymers derived from copolymerization of 2,6-dimethylphenol with 2,3,6-trimethylphenol. Also included are poly (arylene ether)s containing moieties prepared by grafting vinyl monomers or polymers such as polystyrenes, as well as coupled poly (arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s of the present invention further include combinations of any of the above.

The poly(arylene ether) generally has a number average molecular weight of about 3,000 to about 40,000 atomic mass units (AMU) and a weight average molecular weight of about 20,000 to about 80,000 AMU, as determined by gel permeation chromatography. The poly (arylene ether) generally may have an intrinsic viscosity of about 0.2 to about 0.6 deciliters per gram (dL/g) as measured in chloroform at 25° C. Within this range, the intrinsic viscosity may preferably be up to about 0.5 dL/g, more preferably up to about 0.47 dL/g. Also within this range, the intrinsic viscosity may preferably be at least about 0.3 dL/g. It is also possible to utilize a high intrinsic viscosity poly(arylene ether) and a low intrinsic viscosity poly(arylene ether) in combination. Determining an exact ratio, when two intrinsic viscosities are used, will depend on the exact intrinsic viscosities of the poly(arylene ether)s used and the ultimate physical properties desired.

The poly(arylene ether)s are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful poly(arylene ether)s for many purposes include those that comprise molecules having at least one aminoalkyl-containing end group. The aminoalkyl radical is typically located in an ortho position relative to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of the aminoalkyl-containing and 4-hydroxybiphenyl end groups.

The composition may comprise poly(arylene ether) in an amount of about 15 to about 35 weight percent, based on the total weight of the composition. It may be preferred to use the poly(arylene ether) in an amount of about 15 to about 32 weight percent.

The composition further comprises a homopolymer of an alkenyl aromatic monomer, wherein the alkenyl aromatic monomer has the formula

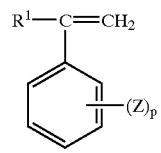

wherein $R^1$ is hydrogen, $C_1$–$C_8$ alkyl, halogen, or the like; Z is vinyl, halogen, $C_1$–$C_8$ alkyl, or the like; and p is 0 to 5. Preferred alkenyl aromatic monomers include styrene, chlorostyrenes such as p-chlorostyrene, and methylstyrenes such as p-methylstyrene. A particularly preferred homopolymer of an alkenyl aromatic monomer is the homopolymer derived from styrene (i.e., homopolystyrene). The homopolystyrene preferably comprises at least 99% of its weight, more preferably 100% of its weight, from styrene.

Highly preferred homopolystyrenes include atactic and syndiotactic homopolystyrenes. Suitable atactic homopolystyrenes are commercially available as, for example, EB3300 from Chevron, and P1800 from BASF. Suitable syndiotactic homopolystyrenes are commercially available, for example, under the tradename QUESTRA® (e.g., QUESTRA® WA550) from Dow Chemical Company.

The composition may comprise the homopolymer of an alkenyl aromatic monomer in an amount of about 15 to about 46 weight percent, based on the total weight of the composition. Within this range, amounts of at least about 20 weight percent may be preferred.

In one embodiment, the amount of the homopolymer of an alkenyl aromatic monomer may be expressed as a fraction of the total of poly(arylene ether) and the homopolymer of an alkenyl aromatic monomer. The composition may preferably comprise the homopolymer of an alkenyl aromatic monomer in an amount of about 30 to about 80 weight percent, based on the combined weight of poly(arylene ether) and the homopolymer of an alkenyl aromatic monomer. Within this range, it may be preferred to use an amount of the homopolymer of an alkenyl aromatic monomer up to about 70 weight percent, more preferably up to about 65 weight percent. Also within this range, it may be preferred to use an amount of the homopolymer of an alkenyl aromatic monomer of at least about 35 weight percent, more preferably at least about 40 weight percent. When the amount of the homopolymer of an alkenyl aromatic monomer is less than about 30 weight percent of the total of the poly(arylene ether) and homopolymer of an alkenyl aromatic monomer, the composition after molding may be deficient in flexural modulus. When the amount of the homopolymer of an alkenyl aromatic monomer is greater than about 80 weight percent of the total of the poly(arylene ether) and homopolymer of an alkenyl aromatic monomer, the composition after molding may be deficient in heat distortion temperature. The proportions of the homopolymer of an alkenyl aromatic monomer and the poly(arylene ether) may be manipulated to control the glass transition temperature ($T_g$) of the single phase comprising these two components relative to the $T_g$ of the poly(arylene ether) alone, or relative to the melting temperature ($T_m$) of the polyolefin alone. For example, the relative amounts of the homopolymer of an alkenyl aromatic monomer and the poly(arylene ether) may be chosen so that the poly(arylene ether) and the homopolymer of an alkenyl aromatic monomer form a single phase having a glass transition temperature at least about 20° C. greater, preferably at least about 30° C. greater, than the glass transition temperature of the homopolymer of an alkenyl aromatic monomer alone, which may be, for example, about 100° C. to about 110° C. Also, the relative amounts of homopolymer of an alkenyl aromatic monomer and poly (arylene ether) may be chosen so that the poly(arylene ether) and the homopolymer of an alkenyl aromatic monomer are present in a single phase having a glass transition temperature up to about 15° C. greater, preferably up to about 10° C. greater, more preferably up to about 1° C. greater, than the $T_m$ of the polyolefin alone. The relative amounts of homopolymer of an alkenyl aromatic monomer and poly(arylene ether) may be chosen so that the poly(arylene ether) and the homopolymer of an alkenyl aromatic monomer are present in a single phase having a glass transition temperature of about 130° C. to about 180° C.

The composition further comprises a polyolefin. The polyolefin may be a homopolymer or copolymer having at least about 80 weight percent of units derived from polymerization of ethylene, propylene, butylene, or a mixture thereof. Examples of polyolefin homopolymers include polyethylene, polypropylene, and polybutylene. Examples of polyolefin copolymers include random, graft, and block copolymers of ethylene, propylene, and butylene with each other, and further comprising up to 20 weight percent of units derived from $C_5$–$C_{10}$ alpha olefins (excluding aromatic alpha-olefins). Polyolefins further include blends of the above homopolymers and copolymers. Preferred polyolefins may have a flexural modulus of at least about 100,000 pounds per square inch (psi) at 23° C. as measured according to ASTM D790. Suitable polyolefins may comprise, for example, the linear low density polyethylene available from ExxonMobil as LL-6201, the low density polyethylene available from ExxonMobil as LMA-027, the high density polyethylene available from ExxonMobil as HD-6605, the ultra-high molecular weight polyethylene available as Type 1900 from Montell Polyolefins, and the polybutylene (polybutene-1) available as PB0110 from Montell Polyolefins.

Presently preferred polyolefins include propylene polymers. The propylene polymer may be a homopolymer of polypropylene. Alternatively, the propylene polymer may be a random, graft, or block copolymer of propylene and at least one olefin selected from ethylene and $C_4$–$C_{10}$ alpha-olefins (excluding aromatic alpha-olefins), with the proviso that the copolymer comprises at least about 80 weight percent, preferably at least about 90 weight percent, of repeating units derived from propylene. Blends of such propylene polymers with a minor amount of another polymer such as polyethylene are also included within the scope of propylene polymers. The propylene polymer may have a melt flow index of about 0.1 to about 50 g/10 min, preferably about 1 to about 30 g/10 min when measured according to ASTM D1238 at 2.16 kg and 200° C. The above-described propylene polymers can be produced by various known processes. Commercially available propylene polymers may also be employed.

Preferred propylene polymers include homopolypropylenes. Highly preferred propylene polymers include homopolypropylenes having a crystalline content of at least about 20%, preferably at least about 30%. Suitable isotactic polypropylenes are commercially available as, for example, PD403 pellets from Basell (formerly Montell Polyolefins of North America).

The composition may comprise polyolefin in an amount of about 10 to about 35 weight percent, based on the total weight of the composition. Within this range, polyolefin amounts of at least about 12 weight percent may be preferred. Also within this range, amounts up to about 30 weight percent may be preferred.

The composition comprises a hydrogenated block copolymer of an alkenyl aromatic compound and a conjugated diene having an alkenyl aromatic content of about 40 to about 90 weight percent (hereinafter referred to as the "hydrogenated block copolymer"). The hydrogenated block copolymer is a copolymer comprising (A) at least one block derived from an alkenyl aromatic compound and (B) at least one block derived from a conjugated diene, in which the aliphatic unsaturated group content in the block (B) is reduced by hydrogenation. The arrangement of blocks (A) and (B) includes a linear structure, a grafted structure, and a radial teleblock structure having a branched chain.

Preferred among these structures are linear structures embracing diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B. More preferred are diblock, triblock, and tetrablock structures, with the A-B-A triblock structure being particularly preferred.

The alkenyl aromatic compound providing the block (A) may be represented by the formula

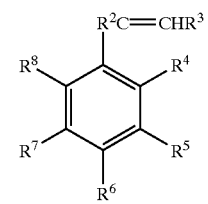

wherein $R^2$ and $R^3$ each independently represent a hydrogen atom, a $C_1$–$C_8$ alkyl group, a $C_2$–$C_8$ alkenyl group, or the like; $R^4$ and $R^8$ each independently represent a hydrogen atom, a $C_1$–$C_8$ alkyl group, a chlorine atom, a bromine atom, or the like; and $R^5$–$R^7$ each independently represent a hydrogen atom, a $C_1$–$C_8$ alkyl group, a $C_2$–$C_8$ alkenyl group, or the like, or $R^4$ and $R^5$ are taken together with the central aromatic ring to form a naphthyl group, or $R^5$ and $R^6$ are taken together with the central aromatic ring to form a naphthyl group.

Specific examples, of the alkenyl aromatic compounds include styrene, p-methylstyrene, alpha-methylstyrene, vinylxylenes, vinyltoluenes, vinylnaphthalenes, divinylbenzenes, bromostyrenes, chlorostyrenes, and the like, and combinations comprising at least one of the foregoing alkenyl aromatic compounds. Of these, styrene, alpha-methylstyrene, p-methylstyrene, vinyltoluenes, and vinylxylenes are preferred, with styrene being more preferred.

Specific examples of the conjugated diene include 1,3-butadiene, 2-methyl-1,3-butadiene, 2,3-dimethyl-1,3-butadiene, 1,3-pentadiene, and the like. Preferred among them are 1,3-butadiene and 2-methyl-1,3-butadiene, with 1,3-butadiene being more preferred.

In addition to the conjugated diene, the hydrogenated block copolymer may contain a small proportion of a lower olefinic hydrocarbon such as, for example, ethylene, propylene, 1-butene, dicyclopentadiene, a non-conjugated diene, or the like.

The content of the repeating unit derived from the alkenyl aromatic compound in the hydrogenated block copolymer may be about 40 to about 90 weight percent, based on the total weight of the hydrogenated block copolymer. Within this range, the alkenyl aromatic compound content may preferably be at least about 50 weight percent, more preferably at least about 55 weight percent. Also within this range, the alkenyl aromatic compound content may preferably be up to about 85 weight percent, more preferably up to about 75 weight percent.

There is no particular limitation on the mode of incorporation of the conjugated diene in the hydrogenated block copolymer backbone. For example, when the conjugated diene is 1,3-butadiene, it may be incorporated with about 1% to about 99% 1,2-incorporation, with the remainder being 1,4-incorporation.

The hydrogenated block copolymer is preferably hydrogenated to such a degree that fewer than 50%, more preferably fewer than 20%, yet more preferably fewer than 10%, of the unsaturated bonds in the aliphatic chain moiety derived from the conjugated diene remain unreduced. The aromatic unsaturated bonds derived from the alkenyl aromatic compound may be hydrogenated to a degree of up to about 25%.

The hydrogenated block copolymer preferably has a number average molecular weight of about 5,000 to about 500,000 AMU, as determined by gel permeation chromatography (GPC) using polystyrene standards. Within this range, the number average molecular weight is preferably at least about 10,000 AMU, more preferably at least about 30,000 AMU, yet more preferably at least about 45,000 AMU. Also within this range, the number average molecular weight is preferably up to about 300,000 AMU, more preferably up to about 200,000 AMU, yet more preferably up to about 150,000 AMU.

The molecular weight distribution of the hydrogenated block copolymer as measured by GPC is not particularly limited. The copolymer may have any ratio of weight average molecular weight to number average molecular weight.

Some of these hydrogenated block copolymers have a hydrogenated conjugated diene polymer chain to which crystallinity is ascribed. Crystallinity of the hydrogenated block copolymer can be determined by the use of a differential scanning calorimeter (DSC), for example, DSC-II Model manufactured by Perkin-Elmer Co. Heat of fusion can be measured by a heating rate of, for example, 10° C./min in an inert gas atmosphere such as nitrogen. For example, a sample may be heated to a temperature above an estimated melting point, cooled by decreasing the temperature at a rate of 10° C./min, allowed to stand for about 1 minute, and then heated again at a rate of 10° C./min.

The hydrogenated block copolymer may have any degree of crystallinity. In view of a balance of mechanical strength of the resulting resin composition, those hydrogenated block copolymers having a melting point of about −40° C. to about 160° C. or having no definite melting point (i.e., having non-crystallinity), as measured according to the above-described technique, are preferred. Within the melting point range of about −40° C. to about 160° C., it may be preferred to use a hydrogenated block copolymer having a melting point of at least about −20° C., more preferably at least about 0° C., yet more preferably at least about 20° C., still more preferably at least about 40° C. Also within this range, it may be preferred to use a hydrogenated block copolymer having a melting point of up to about 140° C., more preferably up to about 110° C., yet more preferably up to about 100° C.

The hydrogenated block copolymer may have any glass transition temperature (Tg) ascribed to the hydrogenated conjugated diene polymer chain. From the standpoint of low-temperature impact strength of the resulting resin composition, it preferably has a Tg of up to about −60° C., more preferably up to about −120° C. The glass transition temperature of the copolymer can be measured by the aforesaid DSC method or from the visco-elastic behavior toward temperature change as observed with a mechanical spectrometer.

Particularly preferred hydrogenated block copolymers are the styrene-(ethylene-butylene) diblock and styrene-(ethylene-butylene)-styrene triblock copolymers obtained by hydrogenation of styrene-butadiene and styrene-butadiene-styrene triblock copolymers, respectively.

The hydrogenated block copolymer may be synthesized by block polymerization followed by hydrogenation as described, for example, in U.S. Pat. No. 4,863,997 to Shibuya et al. Suitable hydrogenated block copolymers include the styrene-(ethylene-butylene) diblock and styrene-(ethylene-butylene)-styrene triblock copolymers commercially available as, for example, TUFTEC® H1043 sold by Asahi Chemical.

The composition may comprise the hydrogenated block copolymer in an amount of about 1 to about 15 weight percent based on the total weight of the composition. Within this range, amounts of at least about 2 weight percent may be preferred. Also within this range, amounts of up to about 13 weight percent may be preferred.

The composition further comprises an unhydrogenated block copolymer of alkenyl aromatic compound and a conjugated diene (referred to hereinafter as an "unhydrogenated block copolymer"). The unhydrogenated block copolymer is a copolymer comprising (A) at least one block derived from an alkenyl aromatic compound and (B) at least one block derived from a conjugated diene, in which the aliphatic unsaturated group content in the block (B) has not been reduced by hydrogenation. The alkenyl aromatic compound (A) and the conjugated diene (B) are defined in detail above in the description of the hydrogenated block copolymer. The arrangement of blocks (A) and (B) includes a linear structure and a so-called radial teleblock structure having a branched chain.

Preferred of these structures are linear structures embracing diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B. More preferred are diblock, triblock, and tetrablock structures, with the A-B-A triblock structure being particularly preferred.

The unhydrogenated block copolymer may comprise about 10 to about 90 weight percent of the (A) blocks. Within this range, it may be preferred to use at least about 20 weight percent (A) blocks. Also within this range, it may be preferred to use up to about 80 weight percent (A) blocks.

Particularly preferred unhydrogenated block copolymers included styrene-butadiene-styrene triblock copolymers.

Suitable unhydrogenated block copolymers may be prepared by known methods or obtained commercially as, for example, KRATON® D series polymers, including KRATON® D1101 and D1102, from Kraton Polymers (formerly a division of Shell Chemical).

The unhydrogenated block copolymers may be used at about 1 to about 15 weight percent based on the total weight of the composition. Within this range, amounts of at least about 2 weight percent may be preferred. Also within this range, amounts of up to about 13 weight percent, may be preferred.

The composition may, optionally, further comprise a polypropylene-polystyrene graft copolymer. The polypropylene-polystyrene graft copolymer is herein defined as a graft copolymer having a propylene polymer backbone and one or more styrene polymer grafts.

The propylene polymer material that forms the backbone or substrate of the polypropylene-polystyrene graft copolymer is (a) a homopolymer of propylene; (b) a random copolymer of propylene and an olefin selected from the group consisting of ethylene and $C_4$–$C_{10}$ olefins, provided that, when the olefin is ethylene, the polymerized ethylene content is up to about 10 weight percent, preferably up to about 4 weight percent, and when the olefin is a $C_4$–$C_{10}$ olefin, the polymerized content of the $C_4$–$C_{10}$ olefin is up to about 20 weight percent, preferably up to about 16 weight percent; (c) a random terpolymer of propylene and at least two olefins selected from the group consisting of ethylene and $C_4$–$C_{10}$ alpha-olefins, provided that the polymerized $C_4$–$C_{10}$ alpha-olefin content is up to about 20 weight percent, preferably up to about 16 weight percent, and, when ethylene is one of the olefins, the polymerized ethylene content is up to about 5 weight percent, preferably up to about 4 weight percent; or (d) a homopolymer or random copolymer of propylene which is impact-modified with an ethylene-propylene monomer rubber in the reactor as well as by physical blending, the ethylene-propylene monomer rubber content of the modified polymer being about 5 to about 30 weight percent, and the ethylene content of the rubber being about 7 to about 70 weight percent, and preferably about 10 to about 40 weight percent. The $C_4$–$C_{10}$ olefins include the linear and branched $C_4$–$C_{10}$ alpha-olefins such as, for example, 1-butene, 1-pentene, 3-methyl-1-butene, 4-methyl-1-pentene, 1-hexene, 3,4-dimethyl-1-butene, 1-heptene, 1-octene, 3-methyl-hexene, and the like. Propylene homopolymers and impact-modified propylene homopolymers are preferred propylene polymer materials. Although not preferred, propylene homopolymers and random copolymers impact modified with an ethylene-propylene-diene monomer rubber having a diene content of about 2 to about 8 weight percent also can be used as the propylene polymer material. Suitable dienes include dicyclopentadiene, 1,6-hexadiene, ethylidene norbornene, and the like.

The term "styrene polymer", used in reference to the grafted polymer present on the backbone of propylene polymer material in the polypropylene-polystyrene graft copolymer, denotes (a) homopolymers of styrene or of an alkyl styrene having at least one $C_1$–$C_4$ linear or branched alkyl ring substituent, especially a p-alkyl styrene; (b) copolymers of the (a) monomers with one another in all proportions; and (c) copolymers of at least one (a) monomer with alpha-methyl derivatives thereof, e.g., alpha-methylstyrene, wherein the alpha-methyl derivative constitutes about 1 to about 40% of the weight of the copolymer.

The polypropylene-polystyrene graft copolymer will typically comprise about 10 to about 90 weight percent of the propylene polymer backbone and about 90 to about 10 weight percent of the styrene polymer graft. Within these ranges, the propylene polymer backbone may preferably account for at least about 20 weight percent of the total graft copolymer; and the propylene polymer backbone may preferably account for up to about 40 weight percent of the total graft copolymer. Also within these ranges, the styrene polymer graft may preferably account for at least about 50 weight percent, more preferably at least about 60 weight percent, of the total graft copolymer.

The preparation of polypropylene-polystyrene graft copolymers is described, for example, in U.S. Pat. No. 4,990,558 to DeNicola, Jr. et al. Suitable polypropylene-polystyrene graft copolymers are also commercially available as, for example, P1045H1 and P1085H1 from Basell.

When present, the polypropylene-polystyrene graft copolymer may be used in an amount of about 0.5 to about 10 weight percent, based on the total weight of the composition. Within this range, amounts of at least about 1 weight percent may be preferred, with amounts of at least about 2 weight percent being more preferred.

The composition may, optionally, further comprise an ethylene/alpha-olefin elastomeric copolymer. The alpha-olefin component of the copolymer may be at least one $C_3$–$C_{10}$ alpha-olefin. Preferred alpha-olefins include propylene, 1-butene, and 1-octene. The elastomeric copolymer may be a random copolymer having about 25 to about 75 weight percent ethylene and about 75 to about 25 weight percent alpha-olefin. Within these ranges, it may be preferred to use at least about 40 weight percent ethylene; and it may be preferred to use up to about 60 weight percent ethylene. Also within these ranges, it may be preferred to use at least about 40 weight percent alpha-olefin; and it may be preferred to use up to about 60 weight percent alpha-olefin. The ethylene/alpha-olefin elastomeric copolymer may typically have a melt flow index of about 0.1 to about 20 g/10 min at 2.16 kg and 200° C., and a density of about 0.8 to about 0.9 g/ml.

Particularly preferred ethylene/alpha-olefin elastomeric copolymer rubbers include ethylene-propylene rubbers, ethylene-butene rubbers, ethylene-octene rubbers, and mixtures thereof.

The ethylene/alpha-olefin elastomeric copolymer may be prepared according to known methods or obtained commercially as, for example, the neat ethylene-propylene rubber sold as VISTALON® 878 by ExxonMobil Chemical and the ethylene-butylene rubber sold as EXACT® 4033 by ExxonMobil Chemical. Ethylene/alpha-olefin elastomeric copolymers may also be obtained commercially as blends in polyolefins such as, for example, the ethylene-propylene rubber pre-dispersed in polypropylene sold as product numbers Profax 7624 and Profax 8023 from Basell, and the ethylene-butene rubber pre-dispersed in polypropylene sold as Catalloy K021P from Basell.

When present, the ethylene/alpha-olefin elastomeric copolymer may be used in an amount of about 2 to about 20 weight percent, preferably about 2 to about 10 weight percent, based on the weight of the total weight of the composition.

In one embodiment, the amount of ethylene/alpha-olefin elastomeric copolymer may be expressed as a fraction of the total of polyolefin and ethylene/alpha-olefin elastomeric copolymer. Thus, when the ethylene/alpha-olefin elastomeric copolymer is present, its amount may be expressed as about 1 to about 60 weight percent based on the combined weight of polyolefin and ethylene/alpha-olefin elastomeric copolymer. Within this range, it may be preferred to use at least about 10 weight percent of the ethylene/alpha-olefin copolymer. Also within this range, it may be preferred to use up to about 40 weight percent of the ethylene/alpha-olefin copolymer.

The composition is preferably substantially free of a rubber-modified poly(alkenyl aromatic) resin. The term "substantially free" is herein defined as constituting less than 0.5 weight percent, preferably less than 0.1 weight percent, more preferably 0 weight percent, of the total composition. A rubber-modified poly(alkenyl aromatic) resin consists of a polymer derived from at least one alkenyl aromatic monomer, and further consists of a rubber modifier in the form of a blend and/or a graft. The alkenyl aromatic monomer has the formula

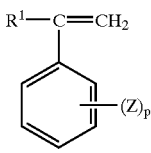

wherein $R^1$ is hydrogen, $C_1$–$C_8$ alkyl, halogen, or the like; Z is vinyl, halogen, $C_1$–$C_8$ alkyl, or the like; and p is 0 to 5. The rubber modifier is a polymerization product of at least one $C_4$–$C_{10}$ nonaromatic diene monomer, such as butadiene or isoprene. The rubber-modified poly(alkenyl aromatic) resin consists of 98 to 70 weight percent of the poly(alkenyl aromatic) resin and 2 to 30 weight percent of the rubber modifier.

The composition may, optionally, further comprise a hydrogenated block copolymer of an alkenyl aromatic compound and a conjugated diene, wherein the hydrogenated block copolymer has an alkenyl aromatic content of about 10 to less than 40 weight percent. For this component, the alkenyl aromatic compound and the conjugated diene compound are the same as those defined above for the hydrogenated block copolymer having an alkenyl aromatic content of 40 to about 90 weight percent. Such materials are commercially available as, for example, KRATON® G1650 and G1652 from Kraton Polymers. When present, the hydrogenated block copolymer having an alkenyl aromatic content of about 10 to less than 40 weight percent may be used at about 1 weight percent to about 20 weight percent, based on the total weight of the composition.

In addition to the components described above, the composition may comprise one or more additives known in the art. Such additives may include, for example, stabilizers, mold release agents, processing aids, flame retardants, drip retardants, nucleating agents, UV blockers, dyes, pigments, particulate fillers (i.e., fillers having an aspect ratio less than about 3), reinforcing fillers, conductive fillers (e.g., conductive carbon black, and vapor grown carbon fibers having an average diameter of about 3 to about 500 nanometers), antioxidants, anti-static agents, and the like. Such additives are well known in the art and appropriate amounts may be readily determined.

In a preferred embodiment, the composition is substantially free of reinforcing fillers (i.e., the composition comprises less than 0.5 weight percent of reinforcing fillers, preferably less than 0.1 weight percent of reinforcing fillers, more preferably no intentionally added reinforcing fillers). For the purposes of this embodiment, a reinforcing filler is any material that is not soluble in either the poly(arylene ether)-containing phase or the polyolefin-containing phase, and which increases the flexural modulus of the composition.

In another preferred embodiment, the composition comprises: about 15 to about 35 weight percent of a poly(arylene ether); about 15 to about 46 weight percent of a homopolystyrene; about 10 to about 35 weight percent of a polyolefin; about 1 to about 15 weight percent of a hydrogenated block copolymer of alkenyl aromatic compound and a conjugated diene having an alkenyl aromatic content of about 40 to about 90 weight percent; about 1 to about 15 weight percent of an unhydrogenated block copolymer of alkenyl aromatic compound and a conjugated diene; and about 2 to about 20 weight percent of an ethylene/alpha-olefin elastomeric copolymer; wherein the composition is substantially free of rubber-modified poly(alkenyl aromatic) resin; and wherein all weight percents are based on the total weight of the composition.

In another preferred embodiment, the composition comprises: about 15 to about 32 weight percent of a poly(arylene ether) that is the polymerization product of 2,6-dimethylphenol, 2,3,6-trimethylphenol, or a combination thereof; about 20 to about 46 weight percent of an atactic homopolystyrene; about 12 to about 30 weight percent of a homopolypropylene; about 2 to about 13 weight percent of a styrene-(ethylene-butylene)-styrene triblock copolymer having a styrene content of about 50 weight percent to about 75 weight percent; and about 2 to about 13 weight percent of a styrene-butadiene-styrene triblock copolymer; wherein the composition is substantially free of rubber-modified poly(alkenyl aromatic) resin; and wherein all weight percents are based on the total weight of the composition.

Another embodiment is a thermoplastic composition, comprising the reaction product of: about 15 to about 35 weight percent of a poly(arylene ether); about 15 to about 46 weight percent of a homopolystyrene; about 10 to about 35 weight percent of a polyolefin; about 1 to about 15 weight percent of a hydrogenated block copolymer of alkenyl aromatic compound and a conjugated diene having an alkenyl aromatic content of about 40 to about 90 weight percent; and about 1 to about 15 weight percent of an unhydrogenated block copolymer of alkenyl aromatic compound and a conjugated diene; wherein the composition is substantially free of rubber-modified poly(alkenyl aromatic) resin; and wherein all weight percents are based on the total weight of the composition.

As the composition is defined as comprising multiple components, it will be understood that each component is chemically distinct, particularly in the instance that a single chemical compound may satisfy the definition of more than one component.

The preparation of the compositions of the present invention is normally achieved by merely blending the ingredients under conditions for the formation of an intimate blend. Such conditions often include mixing in single or twin screw type extruders or similar mixing devices that can apply a shear to the components.

Preferred blending methods are described in detail in the co-filed application U.S. Ser. No. 09/682929 which is incorporated herein in its entirety. In a preferred embodiment, the components are blended in an extruder having at least two addition ports, with at least about 50%, preferably at least about 75%, more preferably 100% of the poly(arylene ether) added upstream, and at least about 50%, preferably at least about 75%, yet more preferably 100%, of the polyolefin added downstream. In another preferred embodiment, the components are blended using at least two mixing stages, comprising upstream mixing and downstream mixing, wherein the upstream mixing is high-energy mixing characterized by at least two mixing elements and/or a mixing section not less than about 1 inch in length. Downstream mixing may be either high-energy mixing as described above or low-energy mixing, depending on the composition and desired properties of the composition.

The composition after molding may preferably have a flexural modulus at 23° C. measured according to ASTM D790 of about 230,000 pounds per square inch (psi) to about 350,000 psi. Within this range, a preferred value of flexural modulus may be at least about 240,000 psi, more preferably at least about 250,000 psi, yet more preferably at least about 300,000 psi.

The composition after molding may have an Izod Notched Impact strength measured at 23° C. according to ASTM D256 of greater than about 1 foot-pound per inch (ft-lb/in), preferably greater than about 1.5 ft-lb/in, more preferably greater than about 2 ft-lb/in, yet more preferably greater than about 4 ft-lb/in.

The composition after molding may have a Dynatup (falling dart) Total Energy at 23° C. measured according to ASTM D3763 of greater than about 1 foot-pound (ft-lb), preferably greater than about 4 ft-lb, more preferably greater than about 6 ft-lb. The Dynatup Total Energy at −30° C. may be greater than about 1 ft-lb, preferably greater than about 2 ft-lb, more preferably greater than about 3 ft-lb.

The composition after molding may have a Dynatup Energy at failure measured at −30° C. according to ASTM D3763 of greater than about 1 ft-lb, preferably greater than about 3 ft-lb, more preferably greater than about 6 ft-lb, yet more preferably greater than about 6 ft-lb.

The composition after molding may have a heat distortion temperature (HDT) measured at 66 psi according to ASTM D648 of at least about 240° F., preferably of at least about 250° F., more preferably at least about 260° F. The heat distortion temperature (HDT) measured at 264 psi may be at least about 190° F., preferably at least about 200° F., more preferably at least about 210° F.

The composition is useful for use in a variety of articles requiring high stiffness, high impact strength, and high heat distortion temperatures. The compositions are, for example, highly suitable for automotive components, including under hood components. The compositions are also highly suitable for molded articles for use with prepared foods, including molded trays for microwavable frozen foods.

The invention is further illustrated by the following non-limiting examples.

EXAMPLES 1–6

Components utilized in the preparation of the thermoplastic composition are listed and described in Table 1.

TABLE 1

| Abbreviation | Description |
| --- | --- |
| PP | isotactic propylene polymer obtained as PD403 (pellet form) from Montell Polyolefin Inc. |
| EPR | Ethylene-propylene copolymer, obtained as VISTALON ® 878 (pellet form) from ExxonMobil Chemical |
| PP-g-PS | Polypropylene-polystyrene graft copolymer, obtained as Interloy P1045H1 (pellet form) from Montell Polyolefin Inc. |
| PPE | poly(2,6-dimethylphenylene ether), intrinsic viscosity (IV) = 0.4 dl/g, obtained in powdered form from General Electric Company |
| xPS | homopolystyrene, obtained as Chevron EB3300 (pellet form) from Huntsman Chemical |

TABLE 1-continued

| Abbreviation | Description |
| --- | --- |
| SBS | unhydrogenated styrene-butadiene-styrene triblock copolymer having about 31% polystyrene, obtained as KRATON ® D1101 (pellet form) from Shell Chemical Company |
| SEBS H1043 | hydrogenated styrene-butadiene-styrene triblock copolymer (also known as styrene-(ethylene-butadiene)-styrene triblock copolymer), 66 weight % polystyrene, obtained as TUFTEC ® H1043 (pellet form) from Asahi Chemical |

General Blending/Compounding Procedure: Using quantities specified in Table 2, PP-g-PS, PPE, xPS, SEBS and SBS were hand mixed in a bag. Unless otherwise specified, all component amounts are expressed in parts by weight. The resulting mixture was subsequently mixed aggressively with a mechanical blender for uniformity. The uniform mixture was subsequently fed through a feeder and entered into an extruder at the extruder initial entry point. In the instance when the quantity of the polystyrene or rubber-modified polystyrene components were each equal to or greater than 10% of the total blend weight, the polystyrene or rubber-modified polystyrene components were fed thorough a separate upstream feeder. Components PP and EPR or EBR, in quantities specified in Table 2, were fed downstream. The entry points were located after the feed throat, at approximately barrel 5 of 10 of the extruder.

General Extrusion: a 30 millimeter co-rotating twin-screw extruder was used. Blends were melt extruded at 520° F., 450–500 rpm, and a throughput rate of 30–55 pounds per hour. Melt from the extruder was forced through a three-hole die to produce melt strands. These strands were rapidly cooled by passing them through a cold-water bath. The cooled strands were chopped into pellets. Pellets were dried in the oven at 200° F. for 2–4 hours.

General Molding: ASTM parts were molded on a 120 tonne molding machine (manufacturer Van Dorn) at 450–550° F. barrel temperature and 100–120° F. mold temperature.

Parts were tested according to ASTM methods. Izod notched and unnotched impact strengths were measured at 23° C. and −30° C. according to ASTM D256. Dynatup (falling dart) total energy and energy to failure were measured at 23° C. and −30° C. and at 5 and 7.5 mph according to ASTM D3763. Heat distortion temperature (HDT) was measured at 66 psi and 264 psi on ⅛ inch samples according to ASTM D648. Flexural modulus and flexural strength at yield were measured at 23° C. on ⅛ inch samples according to ASTM D790. Tensile strength, tensile stress at yield, and tensile elongation at break were measured at 23° C. according to ASTM D638.

The results are presented in Table 2 and show that the composition provides high stiffness and impact strength.

TABLE 2

|  | Ex. 1 | Ex. 2 | Ex. 3 | Ex. 4 | Ex. 5 | Ex. 6 |
|---|---|---|---|---|---|---|
| COMPOSITION | | | | | | |
| PP | 12.15 | 22.15 | 30.00 | 20.00 | 12.15 | 33.90 |
| EPR | 3.63 | 3.63 | 5.00 | 5.00 | 3.63 | 6.20 |
| PP-g-PS | 6.96 | 6.96 | 3.33 | 10.00 | 1.96 | 5.90 |
| SBS | 2.88 | 12.88 | 5.00 | 5.00 | 2.88 | 11.40 |
| SEBS H1043 | 12.88 | 2.88 | 6.67 | 10.00 | 2.88 | 6.30 |
| xPS | 30.55 | 20.55 | 20.00 | 20.00 | 45.55 | 20.20 |
| PPE | 30.96 | 30.96 | 30.00 | 30.00 | 30.96 | 16.20 |
| PROPERTIES | | | | | | |
| Flex Modulus, 23° C., 1/8" (psi) | 228,100 | 231,700 | 247,700 | 260,100 | 350,400 | 221,000 |
| Flex Strength at Yield (psi) | 8,629 | 8,183 | 9,012 | 9,498 | 12,840 | 7,300 |
| HDT, 66 psi, 1/8" (° F.) | 259.2 | 265.1 | 263.0 | 244.7 | 0 | 229.0 |
| HDT, 264 psi, 1/8" (° F.) | 213.7 | 202.6 | 195.8 | 199.6 | 221.3 | 170.0 |
| Notched Izod, 23° C. (ft-lb/in) | 7.6 | 2.9 | 5.6 | 7.7 | 1.7 | 8.9 |
| Notched Izod, −30° C. (ft-lb/in) | 2.6 | 1.5 | 1.1 | 0.9 | 0.9 | 2.5 |
| Unnotched Izod, 23° C. (ft-lb/in) | 31.0 | 34.4 | — | — | 12.9 | — |
| Energy to Fail, 23° C., 7.5 mph (ft-lb) | 33.70 | 26.70 | 20.45 | 18.76 | 2.86 | 19.20 |
| Total Energy, 23° C., 7.5 mph (ft-lb) | 20.25 | 3.98 | 31.25 | 27.34 | 3.69 | 32.40 |
| Energy to Fail, −30° C., 7.5 mph (ft-lb) | 27.86 | 4.26 | 3.06 | 1.53 | 0.73 | 14.70 |
| Total Energy, −30° C., 7.5 mph (ft-lb) | 17.47 | 1.50 | 3.27 | 1.66 | 0.92 | 17.00 |
| Energy to Fail, −30° C., 5 mph (ft-lb) | 19.81 | 1.64 | 6.47 | 1.69 | 8.29 | — |
| Total Energy, −30° C., 5 mph (ft-lb) | 20.69 | 1.48 | 6.70 | 1.79 | 132.10 | — |
| Tensile strength at yield (psi) | 6,046 | 5,597 | 6,178 | 6,389 | 8,701 | 5,060 |
| Tensile Stress at break (psi) | 5,797 | 5,487 | 5,382 | 5,500 | 6,938 | 5,079 |
| Tensile Elongation at break (%) | 83.07 | 26.19 | 120.26 | 92.29 | 20.84 | 273.00 |

EXAMPLES 7–10

These examples illustrate that the composition may enable excellent property balances even when it does not include a polypropylene-polystyrene graft copolymer. They also illustrate the low property variability provided by the composition. Four compositions were prepared and tested according to the procedures described above. Compositions and property values are presented in Table 3. Standard deviations of property values are based on measurements on at least five samples.

TABLE 3

|  | Ex. 7 | Ex. 8 | Ex. 9 | Ex. 10 |
|---|---|---|---|---|
| COMPOSITION | | | | |
| PPE | 27.00 | 30.00 | 30.00 | 24.00 |
| xPS | 18.00 | 20.00 | 20.00 | 31.07 |
| SBS D1101 | 5.00 | 15.00 | 15.00 | 10.00 |
| SEBS H1043 | 10.00 | 10.00 | 10.00 | 10.00 |
| PP | 20.00 | 20.00 | 20.00 | 10.00 |
| EBR | 20.00 | 5.00 | 5.00 | 0.00 |
| EPR | 0.00 | 0.00 | 0.00 | 14.92 |
| PROPERTIES | | | | |
| HDT, 66 psi, 1/8" (° F.) | 249.0 | 254.3 | 254.5 | 233.6 |
| HDT, 66 psi, 1/8", std dev (° F.) | 4.5 | 1.5 | 1.4 | — |
| HDT, 264 psi, 1/8" (° F.) | 184.9 | 195.8 | 195.6 | 190.2 |
| HDT, 264 psi, 1/8", std dev (° F.) | 1.80 | 1.02 | 0.85 | — |
| Notched Izod, 23° C. (ft-lb/in) | 12.5 | 10.2 | 9.9 | 12.1 |
| Notched Izod, 23° C., std dev (ft-lb/in) | 0.3 | 0.2 | 0.1 | — |
| Notched Izod, −30° C. (ft-lb/in) | 8.1 | 4.6 | 5.5 | 9.4 |
| Notched Izod, −30° C., std dev (ft-lb/in) | 0.3 | 0.3 | 0.2 | — |
| Energy to Failure, 23° C., 7.5 mph (ft-lb) | 18.39 | 19.34 | 18.55 | 18.29 |
| Energy to Failure, 23° C., 7.5 mph, std dev (ft-lb) | 1.05 | 0.75 | 0.42 | — |
| Total Energy, 23° C., 7.5 mph (ft-lb) | 27.00 | 27.63 | 27.11 | 26.76 |
| Total Energy, 23° C., 7.5 mph, std dev (ft-lb) | 1.49 | 2.93 | 1.92 | — |
| Energy to Failure, −30° C., 7.5 mph (ft-lb) | 22.14 | 23.74 | 23.37 | 21.07 |
| Energy to Failure, −30° C., 7.5 mph, std dev (ft-lb) | 0.26 | 0.22 | 0.20 | — |
| Total Energy, −30° C., 7.5 mph (ft-lb) | 31.76 | 32.29 | 33.34 | 28.48 |
| Total Energy, −30° C., 7.5 mph, std dev (ft-lb) | 0.84 | 1.45 | 0.92 | — |
| Energy to Failure, −30° C., 5 mph (ft-lb) | 22.44 | 23.73 | 23.23 | 20.88 |
| Energy to Failure, −30° C., 5 mph, std dev (ft-lb) | 0.37 | 0.49 | 0.34 | — |
| Total Energy, −30° C., 5 mph (ft-lb) | 32.42 | 33.03 | 32.88 | 28.65 |
| Total Energy, −30° C., 5 mph, std dev (ft-lb) | 1.20 | 2.29 | 1.17 | — |
| Flexural Modulus, 23° C., 1/8" (psi) | 172,700 | 211,800 | 211,100 | 255,100 |
| Flexural Modulus, 23° C., 1/8", std dev (psi) | 1,004 | 1,235 | 1,933 | — |
| Flexural Strength at yield, 23° C., 1/8" (psi) | 6,501 | 7,787 | 7,801 | 7,522 |

TABLE 3-continued

|  | Ex. 7 | Ex. 8 | Ex. 9 | Ex. 10 |
|---|---|---|---|---|
| Flexural Strength at yield, 23° C., ⅛", std dev (psi) | 30 | 30 | 92 | — |
| Tensile Strength at yield, 23° C. (psi) | 4,746 | 5,445 | 5,415 | 4676 |
| Tensile Strength at yield, 23° C., std dev (psi) | 17.9 | 9.9 | 50.7 | — |
| Tensile Strength at break, 23° C. (psi) | 4,896 | 5,408 | 5,394 | 4288 |
| Tensile Strength at break, 23° C., std dev (psi) | 175 | 111 | 37 | — |
| Tensile Elongation at break, 23° C. (%) | 156.48 | 175.11 | 176.30 | 68.87 |
| Tensile Elongation at break, 23° C., std dev (%) | 31.0 | 10.3 | 9.2 | — |

EXAMPLES 11 AND 12, COMPARATIVE EXAMPLES 1 AND 2

These examples and comparative examples illustrate the impact strength advantages associated with the presence of an unhydrogenated block copolymer in the composition. Eight compositions were prepared and tested according to the procedures described above. Components are the same as those described in Table 1, except that the polyfarylene ether) (PPE) had an intrinsic viscosity of 0.46 dL/g as measured at 25° C. in chloroform. "Additives" refers to a 1:1:3 weight ratio blend of magnesium oxide, zinc sulfide, and tridodecyl phosphite. Compositions and property values are presented in Table 4.

The results show that Examples 11 and 12, containing an unhydrogenated block copolymer, exhibit superior Notched Izod at 23° C. and −30° C., Energy to Maximum Load at −30° C., and Energy to Failure at −30° C., versus Comparative Examples 1 and 2, respectively, not containing an unhydrogenated block copolymer.

TABLE 4

|  | C. Ex. 1 | Ex. 11 | C. Ex. 2 | Ex. 12 |
|---|---|---|---|---|
| COMPOSITION |  |  |  |  |
| PP, PD403 | 32.00 | 32.00 | 27.00 | 27.00 |
| EBR | 0.00 | 0.00 | 5.00 | 5.00 |
| SBS | 0.00 | 5.00 | 0.00 | 5.00 |
| SEBS H1043 | 8.00 | 8.00 | 8.00 | 8.00 |
| xPS | 30.00 | 25.00 | 30.00 | 25.00 |
| HIPS | 0.00 | 0.00 | 0.00 | 0.00 |
| PPE 0.46 IV | 30.00 | 30.00 | 30.00 | 30.00 |
| Additives | 0.00 | 0.25 | 0.25 | 0.25 |
| PROPERTIES |  |  |  |  |
| Flexural Modulus, 23° C., ⅛" (psi) | 315,500 | 274,600 | 275,600 | 251,700 |
| std. dev. | 1,572 | 1,170 | 1,819 | 4,106 |
| Flexural Strength at Yield, 23° C., ⅛" (psi) | 11,700 | 10,180 | 10,450 | 9,413 |
| std. dev. | 65 | 30 | 50 | 99 |
| HDT, 264 psi, ⅛" (° F.) | 215.5 | 207.2 | 212.9 | 203.1 |
| std. dev. | 1.6 | 3.3 | 2.7 | 2.4 |
| HDT, 66 psi, ⅛" (° F.) | 265.4 | 262.4 | 260.3 | 261.3 |
| std. dev. | 1.2 | 2.1 | 1.2 | 2.5 |
| Notched Izod, 23° C. (ft-lb/in) | 0.7 | 1.8 | 1.7 | 5.2 |
| std. dev. | 0.2 | 0.0 | 0.1 | 0.5 |
| Notched Izod, −30° C. (ft-lb/in) | 0.5 | 1.0 | 0.6 | 1.6 |
| std. dev. | 0.1 | 0.1 | 0.1 | 0.3 |
| Energy to Maximum Load, 23° C., 7.5 mph (ft-lb) | 5.95 | 20.09 | 20.43 | 19.75 |
| std. dev. | 4.27 | 0.37 | 0.89 | .0.74 |
| Energy to Failure, 23° C., 7.5 mph (ft-lb) | 6.33 | 30.34 | 28.14 | 29.50 |
| std. dev. | 4.45 | 2.27 | 2.93 | 0.25 |
| Energy to Maximum Load, −30° C., 7.5 mph (ft-lb) | 1.4 | 5.8 | 3.7 | 15.2 |
| std. dev. | 0.41 | 5.35 | 2.99 | 6.99 |
| Energy to Failure, −30° C., 7.5 mph (ft-lb) | 1.51 | 6.07 | 3.94 | 16.43 |
| std. dev. | 0.42 | 5.56 | 3.11 | 8.15 |
| Energy to Maximum Load, −30° C., 5 mph (ft-lb) | 1.02 | 5.42 | 3.49 | 15.15 |
| std. dev. | 0.3 | 5.8 | 1.3 | 8.9 |
| Energy to Failure, −30° C., 5 mph (ft-lb)7669 | 1.13 | 5.65 | 3.62 | 15.62 |
| std. dev. | 0.26 | 5.90 | 1.34 | 9.14 |
| Tensile Strength at Yield, 23° C. (psi) | 7,669 | 6,910 | 7,072 | 6,464 |
| std. dev. | 100.7 | 18.2 | 355.1 | 26.6 |

TABLE 4-continued

|  | C. Ex. 1 | Ex. 11 | C. Ex. 2 | Ex. 12 |
| --- | --- | --- | --- | --- |
| Tensile Strength at Break, 23° C. (psi) | 5,999 | 5,595 | 5,716 | 5,437 |
| std. dev. | 92.7 | 24.7 | 164.7 | 15.6 |
| Tensile Elongation at Break, 23° C. (%) | 36.27 | 69.30 | 49.66 | 75.04 |
| std. dev. | 3.93 | 9.38 | 19.60 | 4.65 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments failing within the scope of the appended claims.

All cited patents patent applications, and other references are incorporated herein by reference in their entirety.

What is claimed is:

1. A thermoplastic composition, comprising:
   about 15 to about 35 weight percent of a poly(arylene ether);
   about 15 to about 46 weight percent of a homopolymer of an alkenyl aromatic monomer;
   about 10 to about 35 weight percent of a propylene polymer; wherein the propylene polymer is a homopolymer of polypropylene, or a random, graft, or block copolymer of propylene and at least one olefin selected from ethylene and $C_4$–$C_{10}$ alpha-olefins, with the proviso that the copolymer comprises at least about 80 weight percent of repeating units derived from propylene;
   about 1 to about 15 weight percent of a hydrogenated block copolymer of alkenyl aromatic compound and a conjugated diene having an alkenyl aromatic content of about 40 to about 90 weight percent, and wherein the hydrogeneted block copolymer comprises a styrene-(ethylene-butylene)-styrene triblock copolymer; and
   about 1 to about 15 weight percent of an unhydrogenated block copolymer of alkenyl aromatic compound and a conjugated diene;
   wherein the composition is substantially free of rubber-modified poly(alkenyl aromatic) resin; and wherein all weight percents are based on the total weight of the composition.

2. The thermoplastic composition of claim 1, wherein the poly(arylene ether) comprises a plurality of structural units of the formula

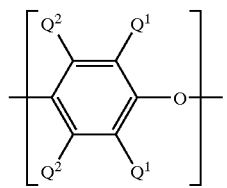

wherein for each structural unit, each $Q^1$ is independently halogen, primary or secondary $C_1$–$C_8$ alkyl, phenyl, $C_1$–$C_8$ haloalkyl, $C_1$–$C_8$ aminoalkyl, $C_1$–$C_8$ hydrocarbonoxy, or $C_2$–$C_8$ halohydrocarbonoxy wherein at least two carbon atoms separate the halogen and oxygen atoms; and each $Q^2$ is independently hydrogen, halogen, primary or secondary $C_1$–$C_8$ alkyl, phenyl, $C_1$–$C_8$ haloalkyl, $C_1$–$C_8$ aminoalkyl, $C_1$–$C_8$ hydrocarbonoxy, or $C_2$–$C_8$ halohydrocarbonoxy wherein at least two carbon atoms separate the halogen and oxygen atoms.

3. The thermoplastic composition of claim 2, wherein each $Q^1$ is independently $C_1$–$C_4$ alkyl or phenyl, and each $Q^2$ is independently hydrogen or methyl.

4. The thermoplastic composition of claim 1, wherein the poly(arylene ether) comprises a copolymer of 2,6-dimethylphenol and 2,3,6-trimethylphenol.

5. The composition of claim 1, wherein the homopolymer of an alkenyl aromatic monomer is a polymerization product of an alkenyl aromatic monomer of the formula

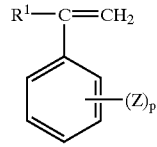

wherein $R^1$ is hydrogen, $C_1$–$C_8$ alkyl, or halogen; Z is vinyl, halogen, or $C_1$–$C_8$ alkyl; and p is 0 to 5.

6. The composition of claim 1, wherein the homopolymer of an alkenyl aromatic monomer comprises homopolystyrene.

7. The composition of claim 1, wherein the homopolymer of an alkenyl aromatic monomer comprises atactic homopolystyrene.

8. The thermoplastic composition of claim 1, wherein the propylene polymer is homopolypropylene polyolefin.

9. The thermoplastic composition of claim 1, wherein the propylene polymer is a homopolymer of polypropylene, or a random, graft, or block copolymer of propylene and at least one olefin selected from ethylene and $C_4$–$C_{10}$ alpha-olefins.

10. The thermoplastic composition of claim 1, wherein the propylene polymer is an isotactic homopolypropylene.

11. The thermoplastic composition of claim 1, wherein the hydrogenated block copolymer comprises:
   (A) at least one block derived from an alkenyl aromatic compound having the formula

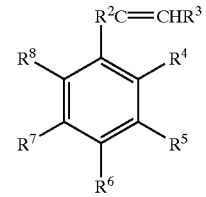

wherein $R^2$ and $R^3$ each represent a hydrogen atom, a $C_1$–$C_8$ alkyl group, or a $C_2$–$C_8$ alkenyl group; $R^4$ and $R^8$ each represent a hydrogen atom, a $C_1$–$C_8$ alkyl group, a chlorine atom, or a bromine atom; and $R^5$–$R^7$ each independently represent a hydrogen atom, a $C_1$–$C_8$ alkyl group, or a $C_2$–$C_8$ alkenyl group, or $R^4$ and $R^5$ are taken together with the central aromatic ring to form a naphthyl group, or $R^5$ and $R^6$ are taken together with the central aromatic ring to form a naphthyl group; and (B) at least one block derived from a conjugated diene, in which the aliphatic unsaturated group content in the block (B) is reduced by hydrogenation.

12. The thermoplastic composition of claim 1, wherein the hydrogenated block copolymer has a styrene content of about 50 to about 85 weight percent.

13. The thermoplastic composition of claim 1, wherein the unhydrogenated block copolymer has a styrene content of about 55 to about 70 weigth percent.

14. The thermoplastic composition of claim 1, wherein the unhydrogenated block copolymer comprises a styrene-butadiene diblock copolymer or a styrene-butadiene-styrene triblock copolymer.

15. The thermoplastic composition of claim 1, further comprising a hydrogenated block copolymer of an alkenyl aromatic compound and a conjugated diene, wherein the hydrogenated block copolymer has an alkenyl aromatic content of about 10 to less than 40 weight percent.

16. The composition of claim 1, further comprising about 2 to about 20 weight percent of an ethylene/alpha-olefin elastomeric copolymer.

17. The thermoplastic composition of claim 16, wherein the ethylene/alpha-olefin elastomeric copolymer comprises a copolymer of ethylene and at least one $C_3$–$C_{10}$ alpha-olefin.

18. The thermoplastic composition of claim 16, wherein the ethylene/alpha-olefin elastomeric copolymer comprises an ethylene-butylene rubber, an ethylene-propylene rubber, or a mixture thereof.

19. The composition of claim 1, wherein the composition is substantially free of reinforcing fillers.

20. The composition of claim 1, wherein the composition after molding has a flexural modulus measured at 23° C. according to ASTM D256 of at least about 230,000 pounds per square inch.

21. The composition of claim 1, wherein the composition after molding has an Izod Notched Impact strength measured at 23° C. according to ASTM D256 of at least about 1 foot-pound per inch.

22. The composition of claim 1, wherein the composition after molding has an Izod Notched Impact strength measured at 23° C. according to ASTM D256 of at least about 2 foot-pounds per inch.

23. The composition of claim 1, wherein the composition after molding has a heat distortion temperature measured at 66 psi according to ASTM D648 of at least about 240° F.

24. The composition of claim 1, wherein the composition after molding has a flexural modulus at 23° C. of at least about 230,000 pounds per square inch and an Izod Notched Impact strength measured at 23° C. according to ASTM D256 of at least about 4 foot-pounds per inch.

25. The composition of claim 1, wherein the composition after molding has a flexural modulus at 23° C. of at least about 300,000 pounds per square inch and an Izod Notched Impact strength measured at 23° C. according to ASTM D256 of at least about 1.5 foot-pounds per inch.

26. The thermoplastic composition comprising:
about 15 to about 35 weigth percent of poly(arylene ether);
about 15 to about 46 weigth percent of a homopolymer of an alkenyl aromatic monomer;

about 10 to about 35 weigth percent of a polyolefin;
about 1 to about 15 weigth percent of a hydrogenated block copolymer of alkenyl aromatic compound and a conjugated diene having an alkenyl aromatic content of 40 to about 90 weigth percent, and wherein thru hydrogenated block copolymer comprises a styrene-(ethylene-butelene)-styrene triblock copolymer;
about 1 to about 15 weigth percent of an unhydrogenated block copolymer of alkenyl aromatic compound and a conjugated diene; and
a polypropylene-polystyrene graft copolymer having a propylene polymer backbone and one or more styrene polymer grafts;
wherein the composition is substantially free of rubber-modified poly(alkenyl aromatic) resin; and wherein all weigth percent are based on the total weigth of the composition.

27. The thermoplastic composition, comprising:
about 15 to about 35 weigth percent of poly(arylene ether);
about 15 to about 46 weigth percent of a homopolymer of an alkenyl aromatic monomer;
about 10 to about 35 weigth percent of a polyolefin;
about 1 to about 15 weigth percent of a hydrogenated block copolymer of alkenyl aromatic compound and a conjugated diene having an alkenyl aromatic content of 40 to about 90 weigth percent, and wherein thru hydrogenated block copolymer comprises a styrene-(ethylene-butelene)-styrene triblock copolymer;
about 1 to about 15 weigth percent of an unhydrogenated block copolymer of alkenyl aromatic compound and a conjugated diene; and
a polypropylene-polystyrene graft copolymer having a propylene polymer backbone and one or more styrene polymer grafts; wherein the polypropylene-polystyrene graft copolymer comprises about 10 to about 90 weigth percent propylene polymer backbone and about 90 to about 10 weigth percent styrene polymer grafts.
wherein the composition is substantially free of rubber-modified poly(alkenyl aromatic) resin; and wherein all weigth present are based on the total weigth of the composition.

28. A thermoplastic composition, comprising:
about 15 to about 35 weight percent of a poly(arylene ether);
about 15 to about 46 weight percent of a homopolystyrene;
about 10 to about 35 weight percent of a propylene polymer; wherein the propylene polymer is a homopolymer of polypropylene, or a random, graft, or block copolymer of propylene and at least one olefin selected from ethylene and $C_4$–$C_{10}$ alpha-olefins, with the proviso that the copolymer comprises at least about 80 weigth percent of repeating units derived from propylene;
about 1 to about 15 weight percent of a hydrogenated block copolymer of alkenyl aromatic compound and a conjugated diene having an alkenyl aromatic content of about 40 to about 90 weight percent, and wherein the hydrogenated block copolymer comprises a styrene-(ethylene-butylen)-styrene triblock copolymer;
about 1 to about 15 weight percent of an unhydrogenated block copolymer of alkenyl aromatic compound and a conjugated diene; and about 2 to about 20 weight percent of an ethylene/alpha-olefin elastomeric copolymer;

wherein the composition is substantially free of rubber-modified poly(alkenyl aromatic) resin; and wherein all weight percents are based on the total weight of the composition.

29. A thermoplastic composition, comprising:

about 15 to about 32 weight percent of a poly(arylene ether) that is the polymerization product of 2,6-dimethylphenol, 2,3,6-trimethylphenol, or a combination thereof;

about 20 to about 46 weight percent of an atactic homopolystyrene;

about 12 to about 30 weight percent of a homopolypropylene; and about 2 to about 13 weight percent of a styrene-(ethylene-butylene)-styrene triblock copolymer having a styrene content of about 50 weight percent to about 75 weight percent;

about 2 to about 13 weight percent of a styrene-butadiene-styrene triblock copolymer;

wherein the composition is substantially free of rubber-modified poly(alkenyl aromatic) resin; and wherein all weight percents are based on the total weight of the composition.

30. A thermoplastic composition, comprising the reaction product of:

about 15 to about 35 weight percent of a poly(arylene ether);

about 15 to about 46 weight percent of a homopolymer of an alkenyl aromatic monomer;

about 10 to about 35 weight percent of a propylene polymer; wherein the propylene polymer is a homopolymer of polypropylene, or a random, graft, or block copolymer of propylene and at least one olefin selected from ethylene and $C_4$–$C_{10}$ alpha-olefins, with the proviso that the copolymer comprises at least about 80 weigth percent of repeating, units derived from propylene;

about 1 to about 15 weight percent of a hydrogenated block copolymer of alkenyl aromatic compound and a conjugated diene having an alkenyl aromatic content of about 40 to about 90 weight percent, and wherein the hydrogenated block copolymer comprises a styrene-(ethylene-butylene)-styrene triblock copolymer; and about 1 to about 15 weight percent of an unhydrogenated block copolymer of alkenyl aromatic compound and a conjugated diene;

wherein the composition is substantially free of rubber-modified poly(alkenyl aromatic) resin; and wherein all weight percents are based on the total weight of the composition.

31. An article comprising the composition of claim 30.

32. An automotive component comprising the composition of claim 30.

33. An automotive underhood component comprising the composition of claim 30.

34. A food tray comprising the composition of claim 30.

35. A sheet comprising the composition of claim 30.

* * * * *

UNITED STATES PATENT AND TRADEMARK OFFICE
CERTIFICATE OF CORRECTION

PATENT NO. : 6,861,472 B2
APPLICATION NO. : 09/682923
DATED : March 1, 2005
INVENTOR(S) : Adeyinka Adedeji et al.

It is certified that error appears in the above-identified patent and that said Letters Patent is hereby corrected as shown below:

Column 2,
Line 32, after "rubber–modified", delete "poly (alkenyl" and insert therefor –poly(alkenyl–.

Column 3,
Line 43, after "The", delete "poly (arylene" and insert therefor –poly(arylene–.

Column 5,
Line 21, after "and", delete "poly (arylene" and insert therefor –poly(arylene–.

Column 14,
Lines 28–29, delete "thorough", insert –through–.

Column 17,
Line 22, after "the", delete "polyfarylene" and insert therefor –poly(arylene–.

Column 19,
Line 42, after "of", delete "about".
Line 43, correct misspelling of "hydrogenated".

Column 20,
Line 44, after "homopolypropylene", delete "polyolefin".
Line 46, after "is", delete "a homopolymer of polypropylene, or".

Column 21,
Line 64, after "35", delete "weigth" and insert therefor –weight–.
Line 66, after "46", delete "weigth" and insert therefor –weight–.

Column 22,
Line 1, after "35", delete "weigth" and insert therefor –weight–.
Line 2, after "15", delete "weigth" and insert therefor –weight–.
Line 5, after "40", delete "weigth" and insert therefor –weight–.
Line 5, after "wherein", delete "thru" and insert therefor –the–.
Line 8, after "15", delete "weigth" and insert therefor –weight–.
Line 17, after "all", delete "weigth" and insert therefor–weight .
Line 17, after "total", delete "weigth" and insert therefor –weight–.
Line 20, after "35", delete "weigth" and insert therefor –weight–.
Line 22, after "46", delete "weigth" and insert therefor –weight–.
Line 24, after "35", delete "weigth" and insert therefor –weight–.
Line 25, after "15", delete "weigth" and insert therefor –weight–.

UNITED STATES PATENT AND TRADEMARK OFFICE
CERTIFICATE OF CORRECTION

PATENT NO.         : 6,861,472 B2
APPLICATION NO. : 09/682923
DATED                  : March 1, 2005
INVENTOR(S)       : Adeyinka Adedeji et al.

It is certified that error appears in the above-identified patent and that said Letters Patent is hereby corrected as shown below:

Line 28, after "90", delete "weigth" and insert therefor –weight–.
Line 28, after "wherein", delete "thru" and insert therefor –the–.
Line 32, after "15", delete "weigth" and insert therefor –weight–.
Line 38, after "90", delete "weigth" and insert therefor –weight–.
Line 40, after "10", delete "weigth" and insert therefor –weight–.
Lines 42, 43, after "all", delete "weigth" and insert therefor –weight–.
Line 43, after "total", delete "weigth" and insert therefor –weight–.
Line 57, after "80", delete "weigth" and insert therefor –weight–.

Column 24,
Line 7, after "80", delete "weigth" and insert therefor –weight–.
Line 12, before "40", delete "about".

Signed and Sealed this

Twenty-ninth Day of August, 2006

JON W. DUDAS
*Director of the United States Patent and Trademark Office*